W. O. SHADBOLT.
FIFTH WHEEL FOR VEHICLES.
APPLICATION FILED MAY 27, 1914.
1,155,623.
Patented Oct. 5, 1915.
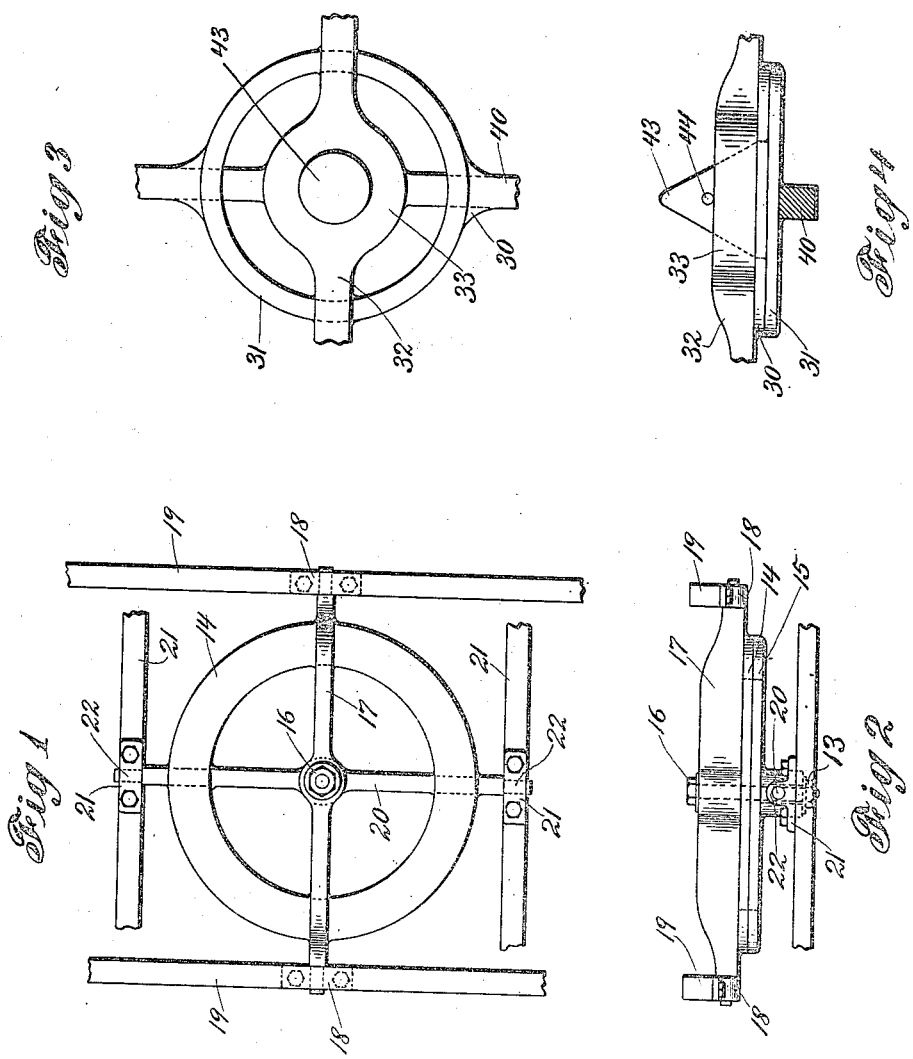

UNITED STATES PATENT OFFICE.

WILLIAM OSCAR SHADBOLT, OF NEW YORK, N. Y.

FIFTH-WHEEL FOR VEHICLES.

1,155,623.

Specification of Letters Patent.

Patented Oct. 5, 1915.

Original application filed September 18, 1913, Serial No. 790,497. Divided and this application filed May 27, 1914. Serial No. 841,281.

*To all whom it may concern:*

Be it known that I, WILLIAM OSCAR SHADBOLT, a citizen of the United States, and a resident of the city and State of New York, have invented certain new and useful Improvements in Fifth-Wheels for Vehicles, of which the following is a specification.

My invention relates to that class of devices known as fifth wheels, which are commonly employed for pivotally connecting the front axles of vehicles to the reach or to the body of the vehicle, and which may also be employed for the purpose of providing a pivotal connection between a tractor and a truck body or the like, this application being a division of application No. 790,497, filed September 18, 1913.

The object of my invention is to provide a fifth wheel which shall obviate certain of the disadvantages of such devices previously known and which shall possess certain advantages over prior devices, as hereinafter set forth.

The invention consists in the novel construction, arrangement and combination of various devices, elements, and parts as shown in the accompanying drawings and hereinafter more particularly described.

In the said drawings, Figure 1, is a plan view of my invention; Fig. 2 is a side or end view thereof; Fig. 3 is a plan view of a modification of my invention; and Fig. 4 is a side or end view of the same.

In carrying my invention into effect, in the embodiment shown in Fig. 1, I provide a fifth wheel comprising an upper member 14 and a lower member 15, both preferably of annular form, pivotally connected together by a king-bolt 16, which may be provided with a nut 13. The upper member 14 is provided with a diametrically extending member 17, rigidly secured to the upper side thereof, the ends of which project beyond the periphery of the said member 14 and are journaled in sockets 18 in bars 19 secured to the under side of the body of a wagon or truck or the like. The lower annular member 15 is provided with a diametrically extending member 20, rigidly secured to the lower side thereof, the ends of which project beyond the periphery of the said annular member 15, and are journaled in sockets 22 in bars 21, which are suitably supported, where the invention is used for coupling a truck to a tractor or the like, on the frame of the said tractor.

It will be observed that the diametrical members 17 and 20 are normally, that is to say, when the two coupled vehicles are in straight alinement, at right angles to each other, but that the said diametrical members, as well as the annular members to which they are respectively secured, are free to swing around on their pivotal connection 16 in a manner which will be well understood.

In the form of the invention shown in Figs. 3 and 4, I provide a fifth wheel comprising two annular members analogous to the members 14 and 15 above described, here designated 30 and 31. The upper member 30 is provided with a diametrically extending member 32, analogous to the member 17 of Figs. 1 and 2, the middle part of which, however, is split so as to assume an annular form as shown at 33 the ends of this member projecting beyond the periphery of the annular member 31, and being journaled in suitable sockets (not shown in the drawing), analogous to the sockets 18 of Figs. 1 and 2. The lower member 31 is provided with a diametrically extending member 40, analogous to the member 20 of Figs. 1 and 2, the projecting ends of which are journaled in suitable sockets, (not shown in the drawing) analogous to the sockets 22 of Figs. 1 and 2, said sockets being suitably secured to the frame of the tractor.

From the portion of the diametrically extending member 40 which is inside of the annular member 31 extends upward a conical member 43, which is in part analogous to the king-bolt in the ordinary form of fifth wheel. This conical member is adapted when the two annular members are assembled to project up through the opening in the annular portion 33 of the diametrically extending member 32, and the said conical member 43 is provided with a transverse opening 44 above the plane of the upper surface of the annular portion 33 of the member 32, which opening is adapted to receive a pin or bolt serving to prevent the separation of the two annular members under strain.

The advantages of the invention will be obvious from what has been above said, but I may mention briefly that the two most important advantages are: the freedom of movement of the planes of the tractor and truck with respect to each other, it being possible for said planes to assume various angular relations with respect to each other while still remaining pivotally coupled together; and the advantage of ease in coupling together a tractor and truck, when the form shown in Figs. 3 and 4 is used. When an ordinary form of fifth wheel, comprising a king-bolt of the usual type is employed as a means of coupling a tractor and truck together, it is obvious that the tractor and the truck must be brought so accurately into correct relation that the opening in the upper member of the fifth wheel, on the truck, shall be exactly in register with the opening in the lower member, on the tractor, before the king-bolt can drop into its opening in the lower member. In using a fifth wheel provided with a conical member, as described in this specification, it is not necessary to bring the parts into such exact relations, for it is obvious that if any part of the comparatively large opening in the upper member is brought into position over the projecting member and the truck body allowed to descend, the parts will automatically place themselves in the proper position. If then a pin or bolt is placed in the transverse opening in the projecting member the two annular members of the fifth wheel are held securely together.

Having thus described my invention what I claim as new and desire to secure by Letters Patent is as follows:

1. A fifth wheel adapted to connect the forward end of a vehicle to a tractor or the like, comprising an upper and a lower member of annular form and means adapted to pivotally connect the said two members together; the said upper member being provided with projections extending beyond the periphery of said upper member and adapted to be journaled in bearings secured to the under side of the forward portion of a vehicle, and said lower member being provided with projections extending beyond the periphery thereof and adapted to be journaled in devices secured to the said tractor, the axis of the lateral projections on one of said annular members being so located as to be in a line substantially at right angles to the axis of the lateral projections on the other of said annular members when the vehicle and the tractor are substantially in alinement.

2. A fifth wheel comprising an upper member having lateral projections journaled under the frame of a vehicle, a lower member having lateral projections journaled over devices located below the vehicle, a projecting member on said lower member, and a socket member on said upper member, said socket member being provided with an opening substantially larger than the upper portion of said projecting member.

3. A fifth wheel comprising an upper member having lateral projections journaled under the frame of a vehicle and a lower member having lateral projections journaled over devices located below the vehicle, one of said members being provided with a projecting member of conical form, and the other of said members being provided with a socket substantially larger than the apex of said conical projecting member.

4. A fifth wheel comprising an upper member having lateral projections journaled under the frame of a vehicle, and a lower member having lateral projections journaled over devices located below the vehicle, one of said members being provided with a projecting member of a form decreasing from its base outward, and the other of said members provided with a socket substantially larger than the smaller portion of said projecting member.

In witness whereof I have hereunto signed my name this 23d day of May 1914, in the presence of two subscribing witnesses.

WILLIAM OSCAR SHADBOLT.

Witnesses:
 EDMOND CONGAR BROWN,
 EDMOND LIVINGSTONE BROWN.

Copies of this patent may be obtained for five cents each, by addressing the "Commissioner of Patents, Washington, D. C."